May 5, 1942.    H. T. OLSON    2,282,285
CAMERA STAND OR TRIPOD
Filed May 16, 1941    4 Sheets-Sheet 1
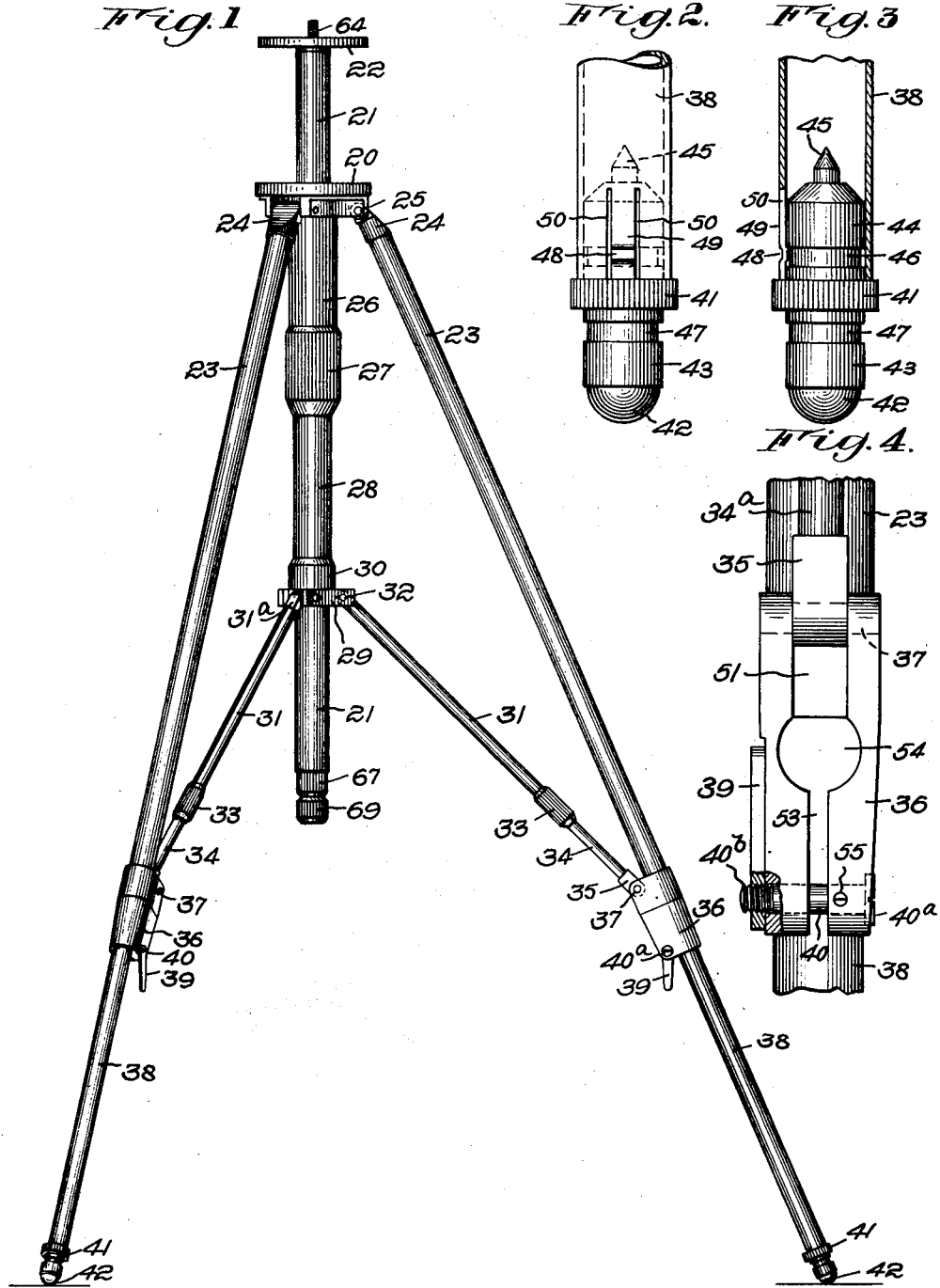
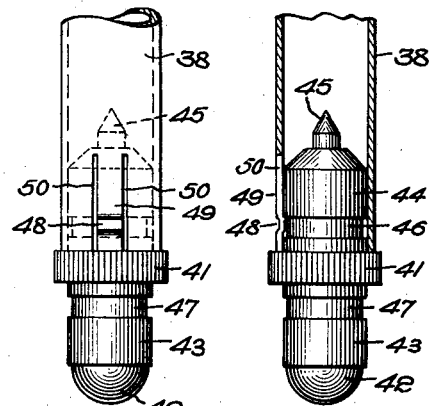
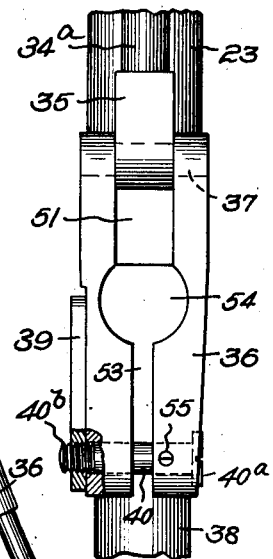
INVENTOR.
Harold T. Olson May 5, 1942.　　H. T. OLSON　　2,282,285
CAMERA STAND OR TRIPOD
Filed May 16, 1941　　4 Sheets-Sheet 2
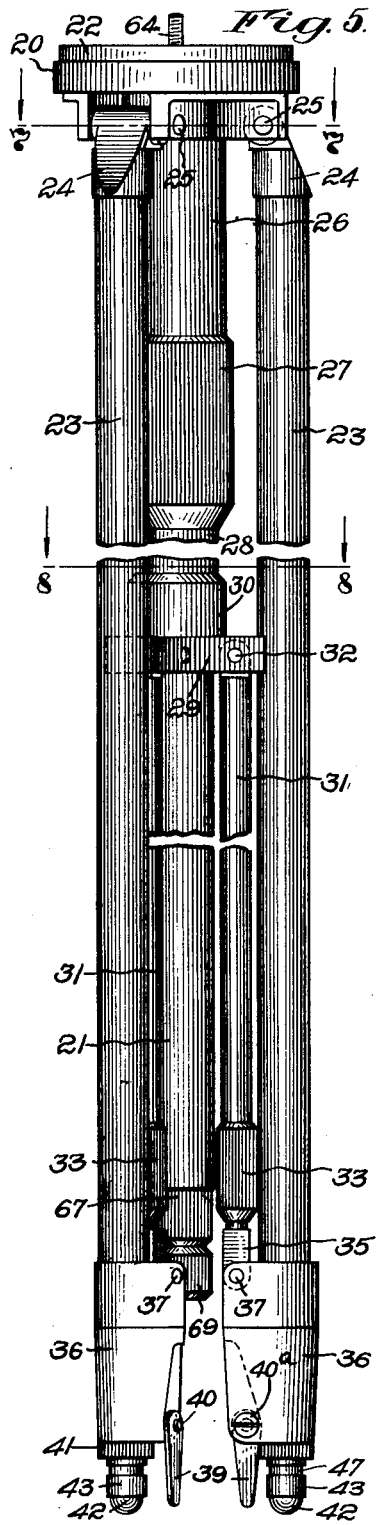
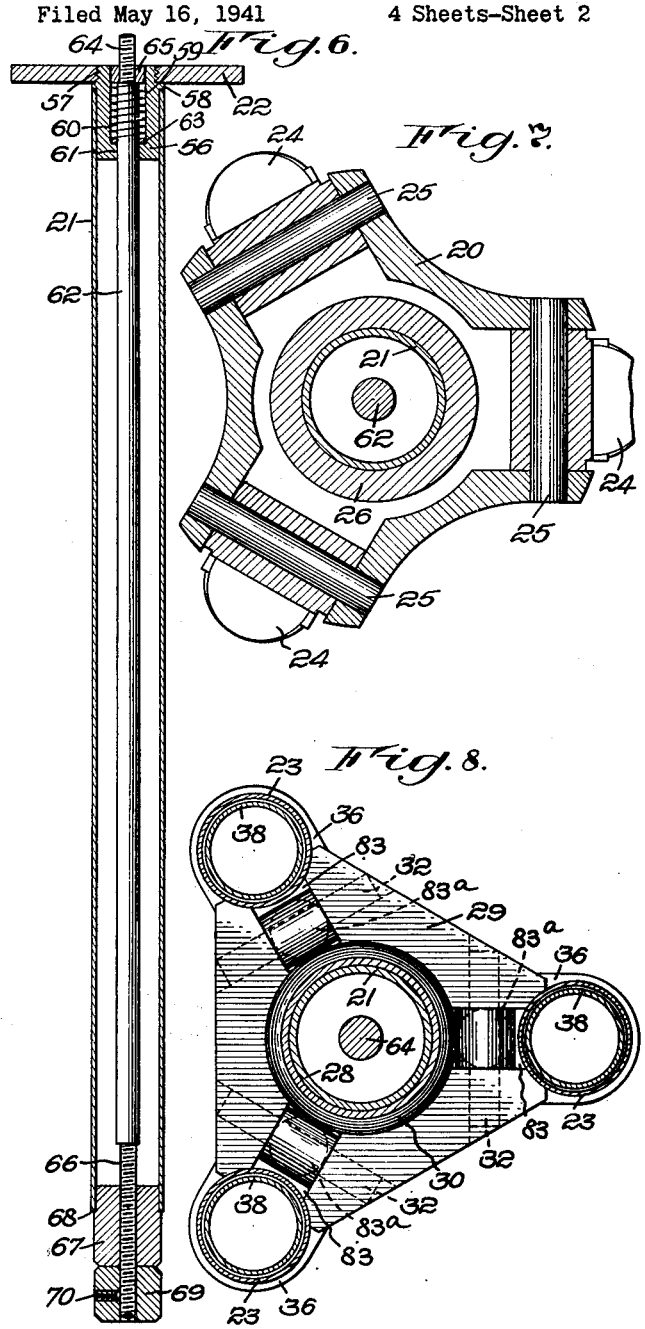
INVENTOR.
Harold T. Olson
BY
his Attorneys May 5, 1942.  H. T. OLSON  2,282,285
CAMERA STAND OR TRIPOD
Filed May 16, 1941    4 Sheets-Sheet 3
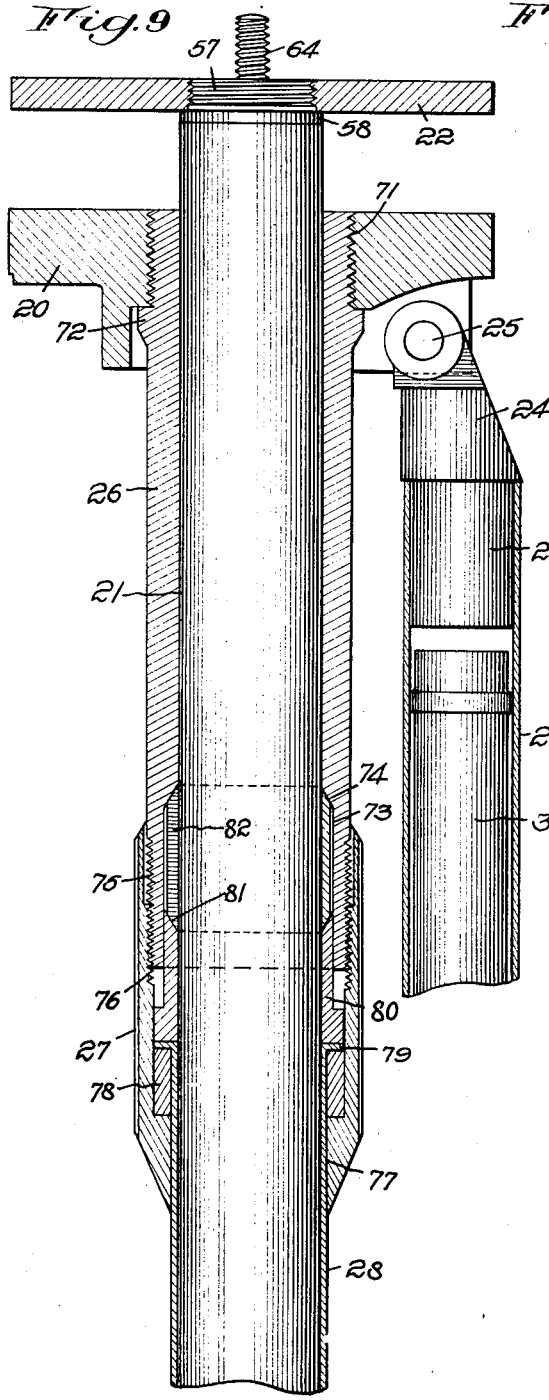
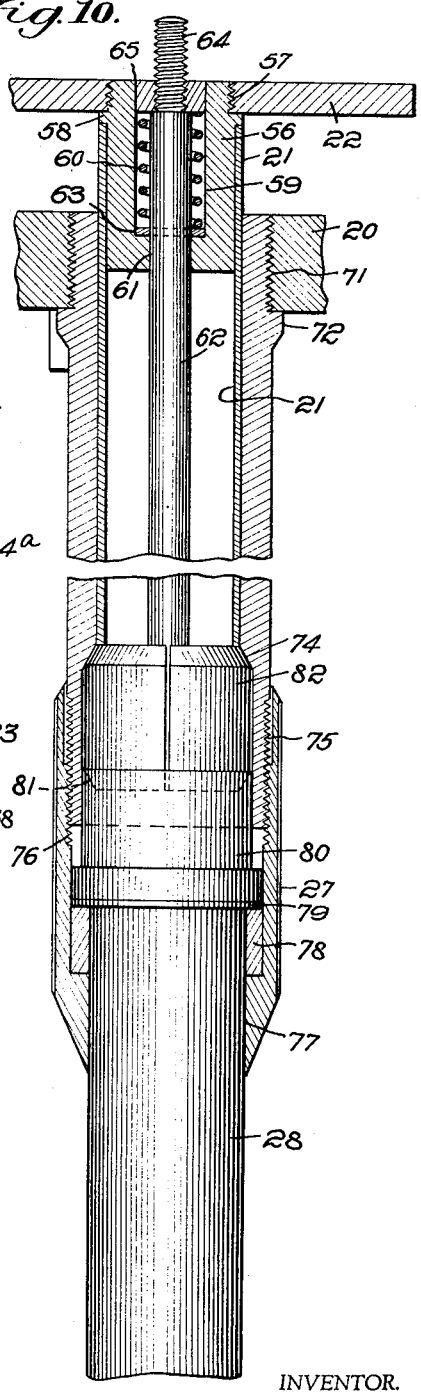
INVENTOR.
Harold T. Olson
BY
his Attorneys.

May 5, 1942.     H. T. OLSON     2,282,285
CAMERA STAND OR TRIPOD
Filed May 16, 1941     4 Sheets-Sheet 4
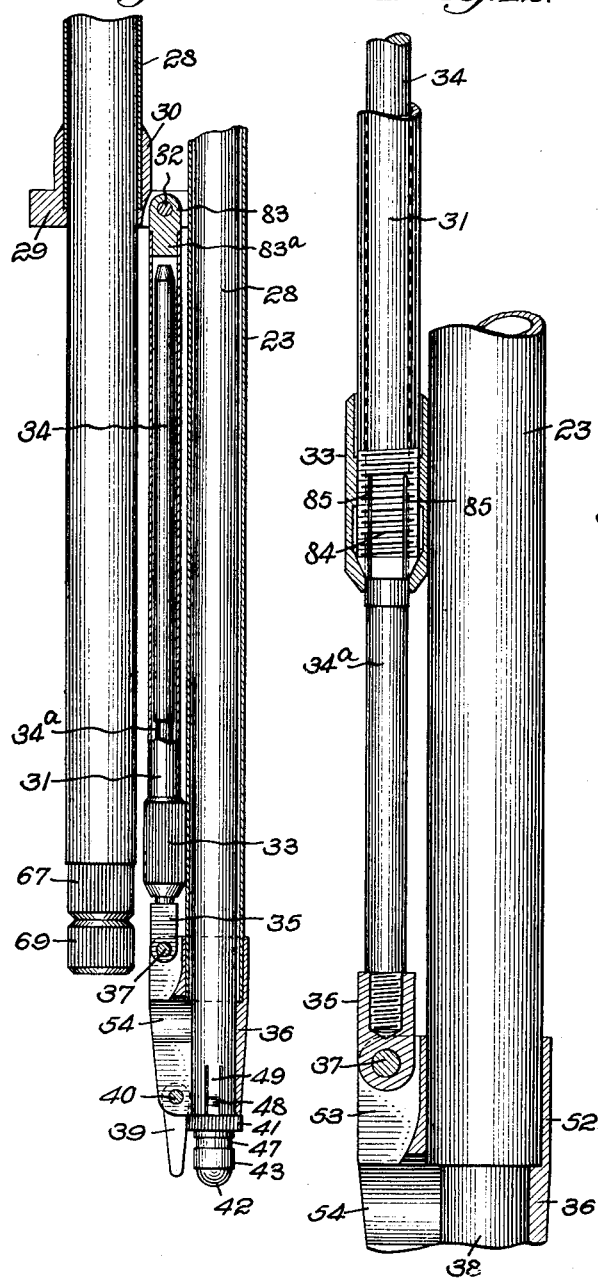
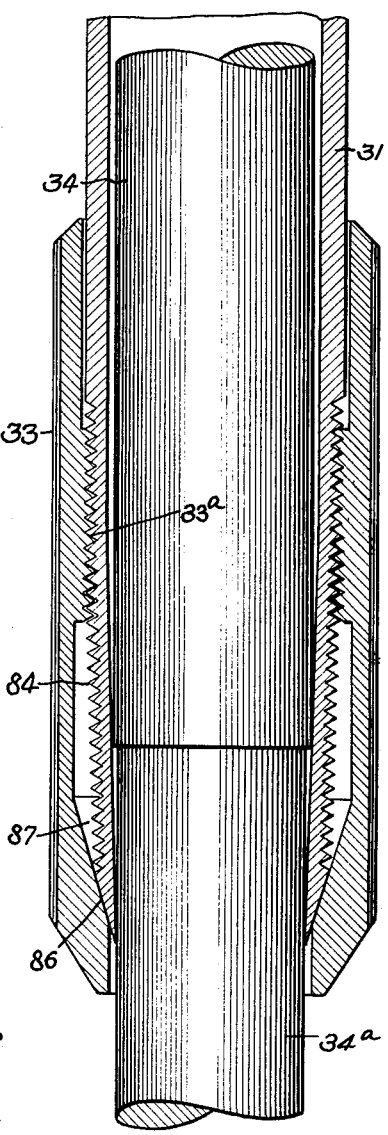
Fig. 11     Fig. 12     Fig. 13
INVENTOR.
Harold T. Olson
BY
his Attorneys.

Patented May 5, 1942

2,282,285

UNITED STATES PATENT OFFICE 2,282,285

CAMERA STAND OR TRIPOD

Harold T. Olson, Rochester, N. Y., assignor to The Folmer Graflex Corporation, Rochester, N. Y., a corporation of Delaware Application May 16, 1941, Serial No. 393,784

13 Claims. (Cl. 248—168)

This invention relates to a camera stand or tripod.

In order that the principle of the invention may be readily understood, I have disclosed a single embodiment thereof in the accompanying drawings, wherein—

Fig. 1 is an elevation of a camera stand or tripod with the legs thereof partially extended and the central column clamped into one of the many possible vertical positions;

Fig. 2 is an enlarged detail in side elevation of the lower part of one of the legs of the camera stand or tripod, showing the position of one of the feet when the rubber contact thereof is in position for use;

Fig. 3 is a longitudinal cross section of Fig. 2, showing the detent for retaining the camera stand or tripod foot;

Fig. 4 is an enlarged detail of one of the leg clamps and brace hinge members with parts )roken away;

Fig. 5 is a side elevation of the camera stand r tripod when in its folded condition;

Fig. 6 is a longitudinal cross section of the amera stand or tripod elevating column;

Fig. 7 is a horizontal section of Fig. 5 on the line 7—7 thereof;

Fig. 8 is a horizontal cross section of Fig. 5 on the line 8—8 thereof;

Fig. 9 is a partial longitudinal cross section through the camera stand or tripod on a larger scale, showing the centrally extending column and clutch therefor, and also showing the mounting of one of the legs;

Fig. 10 is a partial, longitudinal cross section similar to Fig. 9, but wherein the centrally extending column is also shown in longitudinal section;

Fig. 11 is a partial, longitudinal cross section through the camera stand or tripod, showing the lower brace hinge member and one of the leg braces in section;

Fig. 12 is an enlarged detail, partly in longitudinal section, of a portion of one of the camera stand or tripod leg brace members; and Fig. 13 is a vertical cross section upon an enlarged scale, taken through one of the brace member chucks.

The camera stand or tripod herein disclosed is particularly adapted to be constructed of lightweight metals, and the construction is such that the greatest possible advantage is taken of the use of such metals, so as to provide a camera stand or tripod which, though light in weight, will when extended for use present and embody a very rigid and substantial structure.

Objects of my invention are: to provide a camera stand or tripod having a centrally extending column that can be adjusted in a vertical direction and clamped in any desired position and there maintain great rigidity of the central column with respect to the tripod structure; to provide a clutch or clamping means that can be placed in a convenient position for operation, together with means to prevent the turning of the central column when the chuck is loosened or tightened; to provide a camera stand or tripod with very convenient means of attaching a camera thereto; to provide leg braces that can be clamped securely when spread for use; to provide means to determine a selected spread of the camera stand or tripod legs so that all the legs thereof will be spread an equal distance about the center of the camera stand or tripod; and to provide clamping means for the extending legs that is easily operated and which can be securely locked in position.

Referring first mainly to Figs. 1 to 4 of the drawings, the camera stand or tripod head member is indicated at 20, a central vertically or lengthwise extending column at 21 and a vertical column support plate at 22. Upper leg sections are indicated at 23, being shown as provided with hinge members 24 respectively hinged to the camera stand or tripod head member 20 by pins 25. As best shown in Fig. 9, the several hinge members 24 are each provided with a boss 24a tightly fitted into the leg 23 pertaining thereto. To the said head member 20 is suitably attached a cylindrical member or sleeve 26 having threaded thereto a chuck sleeve 27 which has loosely attached thereto a second cylindrical section or sleeve 28, to which is attached a leg-support brace bracket or member 29 by means of a cylindrical hub or boss 30 having a press fit about the said second cylindrical section or sleeve 28, as most clearly shown in Fig. 11.

Attached to the leg support, brace bracket or member 29 are leg support, tubular, brace members 31 each having a hinge member 31a attached to the said leg support or brace bracket 29 by hinge pins 32. The lower end of each of the leg support, tubular, brace members 31 is provided with a chuck 33 internally threaded at 33a, and into each such chuck is inserted a brace rod 34, the lower end of each of which is provided with a brace hinge member 35 having attached thereto a leg clamp or clamping member 36 by means of a pin 37. Each brace rod 34, as stated, is provided with a hinge end threaded thereto, as most clearly shown in Fig. 12. A section of the lower end of each brace rod 34 is provided with a reduced diameter 34a, the purpose of which is to enable the operator quickly to set the camera stand or tripod legs to a predetermined spread thereof. In order to accomplish this result when the stand or tripod is in the folded condition shown in Figs. 5 and 11, each chuck 33 is turned in a clockwise direction until resistance is felt to further turning.

Fitted into the several leg clamp or clamping members 36 are leg-extending members 38, which are clamped into any preselected position by means of clamp levers 39, each of which is held to the clamp member 36 pertaining thereto, by a screw or clamp bolt 40. Each clamp lever 39 is provided with suitable threads. Each clamp bolt or screw 40 is provided with a flat head 40a and with a threaded portion 40b. The threads of the several clamp levers 39 engage such threaded portions 40b of the clamp screw or bolt 40, as shown in Fig. 4.

Fitted into the leg-extending members 38 are feet 41, the construction whereof is best shown in Figs. 2 and 3. The lower end of each foot 41 is provided with a rubber ball 42 fitted into a lower cylindrical cup 43. The upper end of each foot 41 is provided with an upper cylindrical part 44 fitted with a metallic peg 45. The said part 44 is provided with an encircling groove 46 and the lower cup member 43 is provided with an encircling groove 47. Either of said grooves, depending upon which end of the tripod foot 41 is inserted into the leg-extending member 38, will be engaged by a detent 48 of a latch member 49 having two lengthwise extending saw cuts 50, 50 in the wall of the lowermost end of the leg-extending member 38. This construction provides means for retaining the tripod foot 41, or any of them, in either of the two possible positions described—that is, with either the ball 42 or the metallic peg 45 protruding from the lower end of the leg-extending member 32.

In Figs. 4, 11 and 12 is shown most clearly the structure of the leg clamp or clamping member 36, previously referred to. As there most clearly shown, the said member, the main body whereof is indicated at 36, has a milled-out slot in the uppermost end 51 thereof, into which slot is fitted the said brace hinge member 35 by the pin 37. The said leg clamp or clamping member 36 is provided with a hole for receiving the leg extending member 38 and with a counterbore 52 into which is fitted the upper leg section 23 of the tripod leg to which that clamp or clamping member pertains. Each of the legs or leg sections 23 is held to the leg clamp or clamping member 36, in any well known manner, as by a shrink fit.

Referring more particularly to Fig. 4, each leg clamp or clamping member 36 is provided with a saw cut 53 extending through to the central opening in the main body of the leg clamp or clamping member 36, and in a vertical or longitudinal direction to a drilled hole 54. Such structure allows the lower end of the main body of the clamp member 36 to be squeezed together by means of the clamp bolt or screw 40 and the lever 39. The said clamp screw or bolt 40 is turned in the leg clamp or clamping member 36 and is threaded into the clamp lever 39 until the leg-extending member 38 has an easy sliding fit in the leg clamp or clamping member 36, bringing the parts including the clamp lever 39 into the position shown in Fig. 4. The clamp screw or bolt 40 is then locked in place by means of a set screw 55. When the clamp lever 39 is turned in a clockwise direction (facing said clamping lever 39) the main body portion of the leg clamp or clamping member 36 will be caused to contract on the said leg-extending member 38, thus securely clamping or locking the leg-extending member 38 into the preselected position.

Making reference more particularly to Figs. 6 and 10, the central vertically or lengthwise extending column 21 has fitted into its upper end a cylindrical member 56, the upper end whereof is provided with threads 57 and an encircling rim or shoulder 58 therebelow. The vertical column support plate 22 is also provided with internal threads and is threaded to the said cylindrical member 56 and against the shoulder 58. The said cylindrical member 56 is attached to the central vertically extending column 21 in any well known manner as by a press or shrink fit, and said cylindrical member 56 is also provided with a centrally located hole or socket 59 to receive a spring 60.

The lower end of the cylindrical member 56 is provided with an opening 61 to receive a clamping rod 62 passing through said opening 61 and said spring 60, and also through a washer 65. The upper end of the said clamping rod 62 is provided with a threaded portion 64 for engaging the camera or other device to be clamped or secured to the camera stand or tripod, and on said threaded portion 64 is a retaining nut or washer 65, the purpose whereof is to prevent the clamping rod 62 from being pulled through the cylindrical member 56. Said washer 65 also provides a shoulder which is acted upon by the spring 60 to move said clamping rod 62 in an upward direction (viewing Fig. 6) for engaging the camera or other device to be attached to the camera stand or tripod.

The lower end of the said clamping rod 62 is provided with a second threaded portion 66 to which is threaded an adjusting nut 67 provided with an encircling shoulder 68 for engaging the end of the central, vertically or lengthwise extending column 21. Also attached to the lower end of the said clamping rod 62 is a second nut 69 locked to the said threaded portion 66 by means of a set screw 70. When the said adjusting nut 67 is turned in a clockwise direction, the length of the threaded portion 64 extending above the support plate 22 is decreased. That is to say, if the adjusting nut 67 is turned in a clockwise direction, the said threaded end 64 will be moved downwardly or inwardly, and if turned in a contraclockwise direction, the said threaded portion 64 will be moved upwardly. This construction provides suitable means for varying the usable length of the threaded portion 64 so as to facilitate the attaching of nuts of various depths. When the threaded end portion 64 is threaded into the attaching nut of a camera or other device to be supported by the stand or tripod, the nuts 67 and 69 are turned together, thus clamping the camera or other object to the support plate 22.

As best illustrated in Figs. 9 and 10, the central, vertically or lengthwise extending column 21 is fitted through the tripod head and through the cylindrical member or sleeve 26. For that purpose the said cylindrical member or sleeve 26 is provided with a threaded portion 71 on its upper end, threaded into the tripod head member 20. A shoulder 72 there provided furnishes a positive stop. The said cylindrical member or sleeve 26 is provided with a hole through which the vertically or longitudinally extending column 21 passes and a close fit is there provided.

As shown in Fig. 9, the lower end of the cylindrical member or sleeve 26 is provided with a counterbore 73 having an angularly faced or formed bottom 74. The said member or sleeve 26 is also provided at its lower end with threads 75 and fitted to said threads is the chuck member or sleeve 27 by means of internal threads 76. The lower end of the chuck sleeve or member 27 is provided with a hole or opening 77 to receive the second cylindrical section or sleeve 28 and fitted about said section or sleeve and opening into the chuck sleeve 27 is a cylindrical ring 78 held to the sleeve or second cylindrical section 28 by the flanged-over end 79. Also fitted into the opening in the chuck sleeve or member 27 is a chuck closing member 80 having a tapered face 81, and fitted about the central, vertically or lengthwise extending column 21 is a chuck or chuck member 82 consisting of a slotted cylindrical part having both its upper end and its lower end tapered to fit taper 74 of the cylindrical member or sleeve 26, and the taper 81 of the chuck closing member 80.

When the chuck sleeve 27 is turned in a clockwise direction viewing Fig. 9, the threaded portion 76 of the chuck sleeve 27 will cause the said cylindrical ring 78 to be moved in an upward direction, and, through contact with the flange 79 of the said second cylindrical section or sleeve 28, will also be caused to move in an upward direction, as will also the chuck closing member 80. Thus the taper 81 will ride up on the chuck member 82, and at the same time the upper end of the chuck member 82 is in engagement with the tapered face 74 of the cylindrical member or sleeve 26, thus causing the chuck member 82 to be contracted about the said control, vertically or lengthwise extending column 21, thereby clamping the latter securely in position.

This structure provides a chuck so positioned that it can be very readily operated and the said cylindrical member or sleeve 26, the chuck sleeve 27, and the second cylindrical section or sleeve 28, provide a central support column to which is attached the described leg support, brace bracket or member 29. The described structure also provides means for tightening the chuck member about the central, vertically or lengthwise extending column 21 without imparting a rotary motion to the said column. The leg support, brace bracket or member 29 is provided, as already stated, with a cylindrical boss or sleeve 30 having a press fit about the second cylindrical section or sleeve 29, as most clearly shown in Fig. 11.

The said leg support, brace bracket or member 29 is provided with slotted openings 83, most clearly shown in Fig. 8, into which is hinged a member 83a attached to the leg-support tubular brace member 31, as is best shown in Fig. 11, and said member 31 is provided with a threaded end 84 having lengthwise extending saw slots 85, 85. The chuck or chuck member 33 is provided, as already described, with the internal thread 33a received over the threaded end 84, and the lowermost end of the leg-support tubular brace member 31 is provided with a tapered face 86. The lower end of the chuck or chuck member 33 is provided with a tapered bore 87.

It will be apparent that with the described construction, when the chuck or chuck member 33 is turned in a clockwise direction, the tapered bore 87 will ride up on the tapered end 86 of the leg-support tubular brace member 31, thus causing the threaded tube end 84 to contract about the brace rod 34, clamping the latter to the said leg-support tubular brace member 31.

Each threaded tube end 84, when the chuck member 33 is turned in a clockwise direction, fits the reduced diameter 34a of the corresponding brace rod 34, but permits the said reduced diameter 34a to be moved in a vertical direction until, when repeated at all the legs, the camera stand or tripod legs are all extended a sufficient distance to cause the large diameter of the several brace rods 34 to be engaged by the contracted wall of the threaded portion 84 of the several leg-support tubular brace members 31. Each brace rod 34 will then be stopped at a definite distance from the central, vertically or lengthwise extending column 21.

When the several brace rods 34 are brought into the position shown in Fig. 13, a wedging or clamping action is imparted to said brace rods 34, thus securely holding the said legs in extended position. If it is desired to extend one or all of the camera stand or tripod legs, each chuck member 33 is turned in a contraclockwise direction, thus allowing the end 84 of the leg-support tubular brace member 31 to expand, and thereupon the brace rods 34 can be positioned as desired to give the selected spacing of the legs. This is very desirable inasmuch as the tripod can be left folded with the several chuck members 33 adjusted, so that when the camera stand or tripod legs are extended for use, they will all move out to a predetermined position and the camera stand or tripod will then stand in a vertical position.

The tripod of my invention can be manufactured at reasonable cost and provides a very rigid and secure supporting unit. All the described adjustments can be quickly and easily made, and when the clamps or chucks are tightened, the several parts are rigidly held together. The central, vertically extending column 21 can be wholly removed from the camera stand and tripod and reversed, so that the vertical column support plate 22 will be positioned below the leg support, brace bracket or member 29, this being often desirable as when a very low position of the camera is needed. When the camera stand or tripod is folded for transportation, and the clamping levers 39 are in position to clamp the lower leg or leg extending members 38, the lower ends of the latter will be contracted sufficiently to prevent the feet 41 from being removed from the tripod. This is a very desirable feature, as during transportation it is of quite common occurrence that one or more of the feet become separated from the camera stand or tripod.

Having thus described one illustrative embodiment of the invention, it is to be understood that although specific terms are employed, they are used in a generic and descriptive sense and not for purposes of limitation, the scope of the invention being set forth in the following claims.

I claim:

1. A stand or tripod for cameras and the like having a central, lengthwise extending column carrying a support plate; a rod axially received in said column with capacity for lengthwise adjustment therein and having an upper end projecting through said support plate to receive the camera or other object to be supported; a cylindrical member receiving said column and having a head member; a set of legs hinged to said head member; a leg-support brace member secured to said cylindrical member; leg-support tubular brace members pivotally connected to said leg-support brace member; and means to clamp said respective tubular brace members to the respective legs.

2. In a stand or tripod for cameras and the like in which a cylindrical column-receiving member is provided, a central, lengthwise extending column received in said member and having at its upper end a support plate, said column being tubular, a clamping rod axially received in said tubular column and having a threaded upper end protruding through said support plate, and means for adjusting said clamping rod axially so as to vary the extent to which the threaded end protrudes through the support plate.

3. A structure according to claim 2, but in which the said means for adjusting the clamping rod axially includes an adjusting nut received upon a threaded portion of said clamping rod.

4. A structure according to claim 2, but in which for adjusting said clamping rod axially it has a threaded end opposite said threaded protruding end and an adjusting nut is received upon said threaded end that is opposite the protruding end, said nut being received in the extreme lower end of said lengthwise extending column.

5. In a stand or tripod for cameras and the like in which a cylindrical column-receiving member is provided, a central, lengthwise extending column received in said member and having at its upper end a support plate, said column being tubular, a clamping rod axially received in said tubular column, and having a threaded upper end protruding through said support plate, a cylindrical member secured to said support plate and depending therefrom and through which said clamping rod extends, and a coiled, expansible spring in said last mentioned tubular member, about said clamping rod.

6. In a stand or tripod for cameras and the like in which a cylindrical column-receiving member is provided, a central, lengthwise extending column received in said member and having at its upper end a support plate, said column being tubular, a clamping rod axially received in said tubular column, and having a threaded upper end protruding through said support plate, a cylindrical member secured to said support plate and depending therefrom and through which said clamping rod extends, and a coiled, expansible spring in said last mentioned tubular member about said clamping rod, the said last mentioned cylindrical member being secured within the upper end of said lengthwise extending column.

7. In a stand or tripod for cameras and the like in which a cylindrical column-receiving member is provided, a central, lengthwise extending column received in said member and having at its upper end a support plate, said column being tubular, a clamping rod axially received in said tubular column, and having a threaded upper end protruding through said support plate, a cylindrical member secured to said support plate and depending therefrom and through which said clamping rod extends, and a coiled, expansible spring in said last mentioned tubular member, about said clamping rod, the said last mentioned cylindrical member being secured within the upper end of said lengthwise extending column, and the said cylindrical member being threaded into the said support plate and having an annular shoulder engaging the under face of said support plate and also the upper end of the lengthwise extending column.

8. A stand or tripod for cameras and the like having a central, lengthwise extending column carrying a support plate; a cylindrical member receiving said column and having a head member; a set of legs hinged to said head member; a leg-support brace member secured to said cylindrical member; leg-support tubular brace members pivotally connected to said leg-support brace member; a clamping means attached to each leg, and means to connect the respective tubular brace members to the corresponding clamping means, such last mentioned means consisting of a set of brace rods connected to said clamping means respectively and extending into said tubular brace members, and a corresponding number of internally threaded chucks, each said tubular brace member having an internally threaded portion engaged by the corresponding internally threaded chuck.

9. A stand or tripod for cameras and the like having a central, lengthwise extending column carrying a support plate; a cylindrical member receiving said column and having a head member; a set of legs hinged to said head member; a leg-support brace member secured to said cylindrical member; leg-support tubular brace members pivotally connected to said leg-support brace member, each tubular brace member receiving therein a brace rod having means to connect said rod to the tripod leg; and chuck means for connecting together each tubular brace member and its brace rod.

10. A stand or tripod for cameras and the like having a central, lengthwise extending column carrying a support plate; a cylindrical member receiving said column and having a head member; a set of legs hinged to said head member; a leg support brace member secured to said cylindrical member; leg-support tubular brace members pivotally connected to said leg-support brace member, each tubular brace member receiving therein a brace rod having means to connect said rod to the tripod leg; and chuck means for connecting together each tubular brace member and its brace rod; said tubular brace member having an externally threaded end terminating in a tapered outer face, and a chuck member threaded internally to engage said threaded portion of the brace member and also having an internally tapered face to engage the externally tapered face of the brace member.

11. A stand or tripod for cameras and the like having a central, lengthwise extending column carrying a support plate; a cylindrical member receiving said column and having a head member; a set of legs hinged to said head member; a leg-support brace member secured to said cylindrical member; leg-support tubular brace members pivotally connected to said leg-support brace-member; brace rods 34 received in the lower ends of said tubular brace members respectively, and means to clamp said respective brace rods to the respective legs, the clamping means for each said brace rod and respective leg including a body member 36 to which the brace rod is pivotally connected, said body member being cut lengthwise to render it springy, and a threaded clamping bolt passing transversely through the said springy parts, and an internally threaded clamping lever received upon the threaded part of said bolt.

12. A stand or tripod for cameras and the like having a central, lengthwise extending column carrying a support plate; a cylindrical member receiving said column and having a head member; a set of legs hinged to said head member; a leg-support brace member secured to said cylindrical member; leg-support tubular brace members pivotally connected to said leg-support brace member, each of said tubular brace members receiving therein a brace rod; means pivotally to connect each brace rod to the corresponding leg; and means adjustably to connect the corresponding tubular brace members and brace rods.

13. A stand or tripod for cameras and the like having a central, lengthwise extending column carrying a support plate; a cylindrical member receiving said column and having a head member; a set of legs hinged to said head member; a leg-support brace member secured to said cylindrical member; leg-support tubular brace members pivotally connected to said leg-support brace member, each of said tubular brace members receiving therein a brace rod; means pivotally to connect each brace rod to the corresponding leg; and means adjustably to connect the corresponding tubular brace members and brace rods, said last mentioned means including internally threaded chuck members to engage an externally threaded surface.

HAROLD T. OLSON.